United States Patent [19]
Kelfer

[11] Patent Number: 4,793,573
[45] Date of Patent: Dec. 27, 1988

[54] FIGURE EIGHT WING DRIVE

[76] Inventor: James W. Kelfer, 1602 Bauerle, Austin, Tex. 78704

[21] Appl. No.: 61,415

[22] Filed: Jun. 12, 1987

[51] Int. Cl.⁴ ............................................. B64C 33/02
[52] U.S. Cl. .................................... 244/11; 244/22; 244/72
[58] Field of Search ............... 244/22, 72, 11; 440/17, 440/19, 102

[56]  References Cited
U.S. PATENT DOCUMENTS

| | | | |
|---|---|---|---|
| 997,521 | 7/1911 | Travis | 244/22 |
| 1,116,273 | 11/1914 | Hassenbach | 244/72 |
| 1,777,652 | 10/1930 | Potts | 244/72 |
| 2,017,534 | 10/1935 | Gray | 244/22 |
| 3,498,574 | 3/1970 | Ernst | 244/22 |
| 4,058,122 | 10/1977 | Gar | 244/22 |
| 4,081,155 | 3/1978 | Kuan | 244/72 |
| 4,139,171 | 2/1979 | Harris | 244/22 |
| 4,261,534 | 4/1981 | Roselli | 244/22 |

Primary Examiner—Galen Barefoot
Assistant Examiner—Rodney Corl

[57] ABSTRACT

A machine designed to move a pair of light weight graphite fiber composite covered wings in such a way that their tips will describe a horizontal figure eight through the air. Thereby sustaining an attack angle and creating lift throughout as much as 80% of their travel path. The mechanism retains 100% control over the wing movement and with a locking device in place the preferred embodiment should be capable of a good glide ratio.

1 Claim, 2 Drawing Sheets

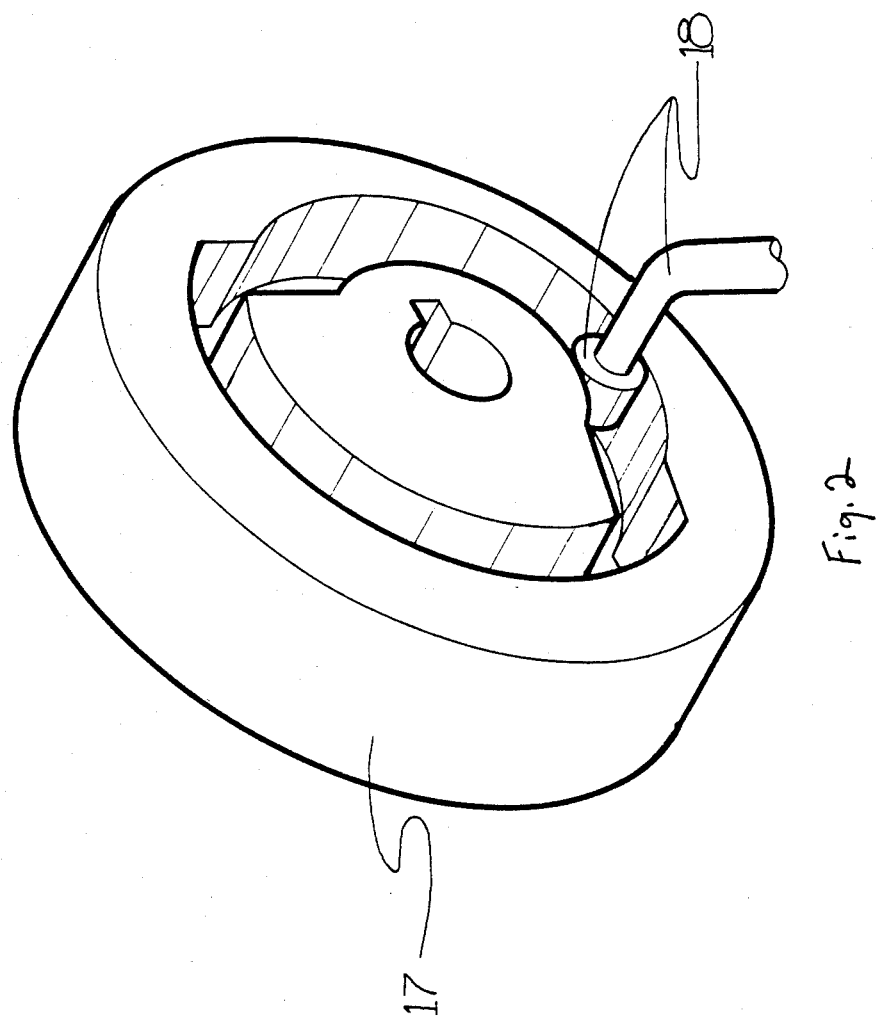

FIGURE EIGHT WING DRIVE

BACKGROUND OF INVENTION

This invention relates to flying craft and specifically to those propelled by moving their wings in relation to their bodies. Prior art includes various ornithopter designs, however this invention is more insect like in its nature, with the wings being stiff and non flexible and moving in a single non varying path.

SUMMARY OF INVENTION

In the prefferred embodiment the materials should be state of the art graphite composites, light weight high strength alloys, high carbon steel, and light weight 2 cycle engines. With these components ten full forward and backward beats per second can be achieved, with 30 square feet of wing surface. Using these materials this machine, with out a passenger will weigh under 100 lbs.

The figure eight movement is achieved by the synchronized action of the crankshaft throw, moving the linear ball bearing and the intermittent motion cam track pivoting the pivoting shafting mount.

The intermittent motion cam track is designed to make two separate rapid movements at approximately 180 degrees apart and otherwise hold a steady position. These rapid movements are synchronize to occur as the linear ball bearing reaches its maximum limit of travel in each direction. At that moment the intermittent motion cam track will cause the pivoting mount to pivot in such a way that the linear ball bearing will always travel down the shafting. As the pivoting mount pivots, raising slightly, the end of the shafting the linear ball bearing is on at that moment, this movement will cause the universal joints to twist the wing center shafts, in their oar locks, to keep the wing at an attack angle, for its subsequent travel down the shafting.

BRIEF DESCRIPTION OF DRAWING

Figure one is a raised front corner view of the Figure Eight Wing Drive components.

Figure two is a side view of the intermittent motion cam track.

DETAILED DESCRIPTIONS OF FIGURES

Figure 1:
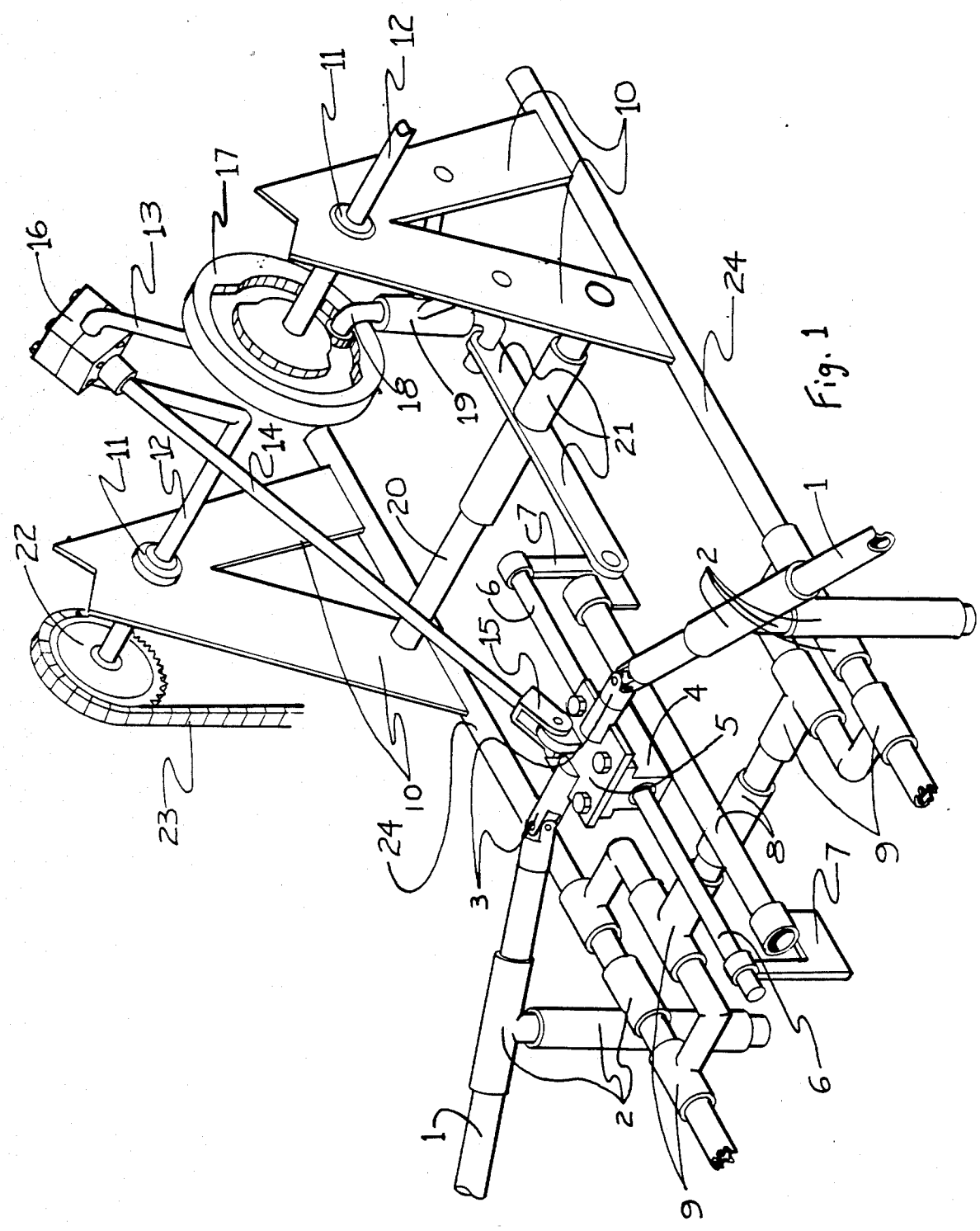

Figure one is of the figure eight wing drive components. The wings center shafts 1, pass through a smooth fitting top tube of the oar lock device 2, on the main frame members 24. These wing shafts are attached to the linear ball bearing top plate 5, by means of universal joints 3. The linear ball bearing top plate 5, is attached to a linear ball bearing and housing 4, which rides upon the linear ball bearing shafting 6. This shafting is held by end brackets 7, to a pivoting mount 8, which in turn is held by supports 9, attached to the main frame members 24.

Beyond one end of the above assembly, connected to the main frame members 24, are two raised crankshaft bearing supports 10, which hold the crankshaft bearings 11, and the crankshaft 12. On the crankshaft throw 13, is a split bearing box 16, which holds the connecting rod 14, to the throw 13. The opposite end of the connecting rod 14, is attached to the linear ball bearing top plate 5, by a hinge and pin connection 15. Also on the crank shaft, 12, synchronized with the throw 13,, is an intermittent motion cam track 17, with gear teeth along both sides of the track, and upon these gear teeth ride an idler gear, free spinning on the cam follower 18. This cam follower 18, is attached by means of a cam follower rocker 21, to the shafting end bracket 7, closes to the crankshaft 12. The cam follower 18, is held in place by the cam follower support bracket and tube 19, which is in turn held by the crankshaft bearing supports 10. The cam follower rocker rides on a mounting shaft 20. also held by the crankshaft bearing supports 10. Also on the crankshaft 12, is a drive chain sprocket 22, connected to the drive motor (not shown) by the drive chain 23.

Figure two shows one possible configuration of the intermittent motion cam track.

I claim:

1. A mechanical wing drive to propel a flying machine comprising: a center shaft extending from the base of each of a pair of wings and extending through one of a pair of oarlock devices, each said oarlock device attached to one of two parallel main frame members, the end of each said center shaft connected by a universal joint to a common plate mounted on top of a linear ball bearing, said linear ball bearing riding on a shaft held by a bracket on each end of said shaft, said shaft connected to a pivoting mount supported between said main frame members, also on said main frame members, beyond said overlock devices, are two raised crankshaft bearing supports which hold a crankshaft, said crankshaft creating back and forth motion of said center shafts, said crankshaft extending across said main frame members, said linear ball bearing running parallel with and between said main frame members, a connecting rod attached on one end to a throw on said crankshaft and on its other end to said common plate, also on said crankshaft is an intermittent motion cam track, synchronized with said throw, and connected by a cam follower to a cam follower rocker for creating up-down motion of said center shafts, said cam follower rocker connected to said bracket on said shaft end closest to said crankshaft, also on said crankshaft is a drive chain sprocket connected by a drive chain to a drive motor, wherein said crankshaft and said intermittent motion cam track cooperate to create a "figure 8" motion of said center shaft extending from each wing.

* * * * *